United States Patent Office 2,771,576
Patented Nov. 20, 1956

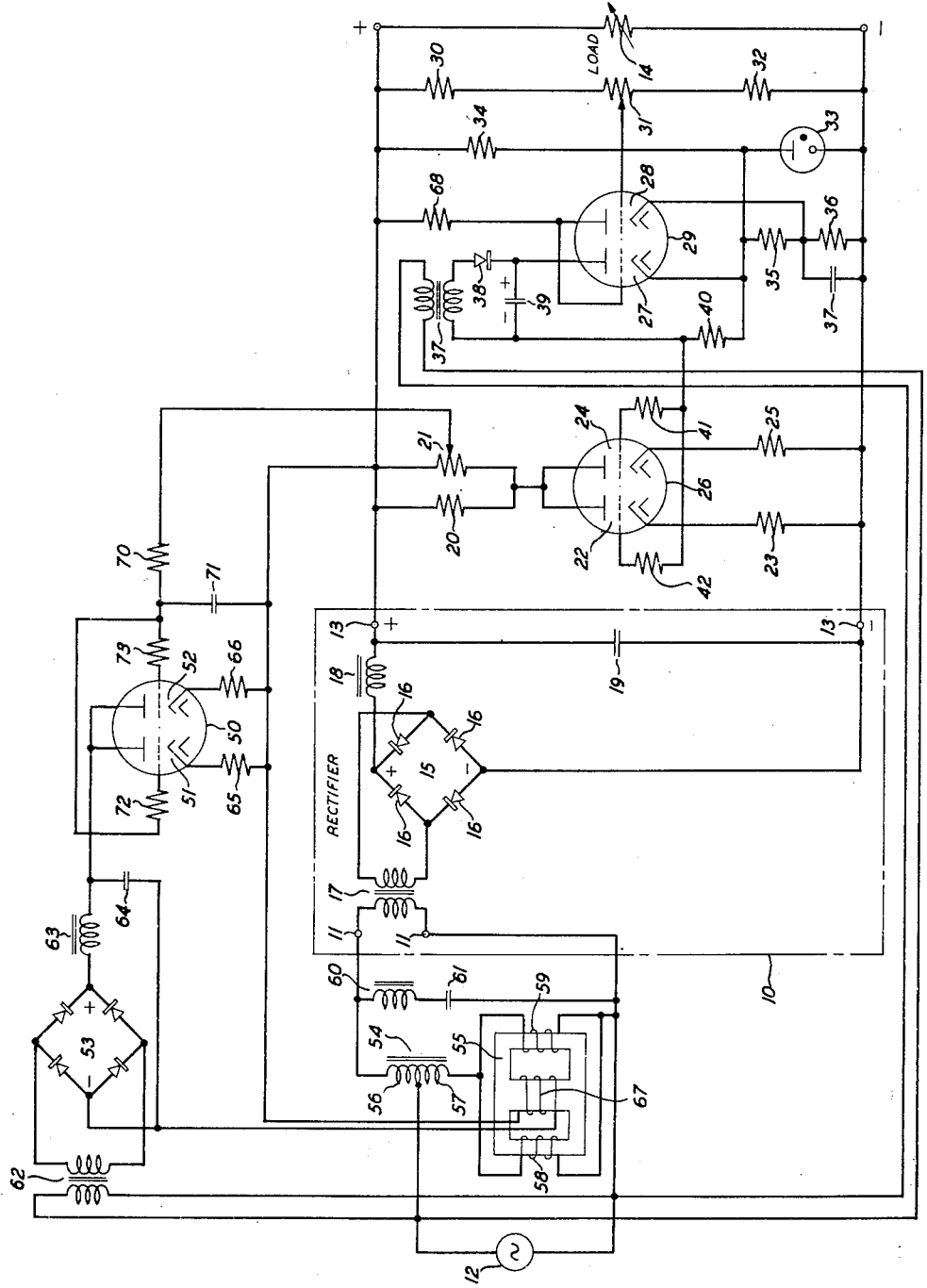

2,771,576

CURRENT SUPPLY APPARATUS

George W. Meszaros, New York, N. Y., assignor to Bell Telephone Laboratories, Incorporated, New York, N. Y., a corporation of New York Application October 22, 1953, Serial No. 387,753

6 Claims. (Cl. 321—18)

This invention relates to current supply apparatus and particularly to apparatus for minimizing voltage changes across a load to which current is supplied from a rectifier.

An object of the invention is to provide improved apparatus for regulating the output voltage of a rectifier for supplying current to a load.

In a specific embodiment of the invention herein shown and described for the purpose of illustration, there is provided rectifying apparatus for supplying direct current to a load connected across the rectifier output when alternating current from an alternating-current supply source is supplied to the rectifier input. A shunt current path is connected across the rectifier output in parallel with the load, this shunt current path comprising the space current path of a space current device or a plurality of such space current paths in parallel. A voltage having variations corresponding to load voltage changes is impressed upon a control circuit of the space current device to control the resistance of the space current path and thereby minimize instantaneous changes of load voltage. To prevent overloading of the space current device or devices in the shunt current path across the load, means are provided for regulating the alternating voltage impressed upon the rectifier input. Current from an alternating-current supply source is supplied through a first portion of an autotransformer winding to the rectifier input and current from the supply source is also supplied through an impedance winding of a saturable reactor to the remaining portion of the autotransformer winding. Current from an auxiliary rectifier is supplied to a saturating winding of the saturable reactor. The amplitude of this saturating current is controlled by means of a space current device, the resistance of the space current path of the space current device being controlled in response to changes of average current in the shunt current path across the load. In this manner changes of average current in the shunt current path across the load are minimized.

The invention will now be described with reference to the accompanying drawing, the single figure of which is a schematic view of a current supply apparatus embodying the invention.

Referring to the drawing, there is provided a rectifying apparatus 10 having a pair of input terminals 11 across which is impressed an alternating voltage from an alternating-current supply source 12 and having a pair of output terminals 13 across which is connected a load 14 which may vary. The rectifying apparatus comprises a rectifier bridge 15 having selenium rectifying elements 16, for example, connected in the bridge arms. There is provided an input transformer 17 having its primary connected to the input terminals 11 and its secondary connected to the input terminals of the rectifier bridge 15. The output terminals of the rectifier bridge are connected through a ripple filter comprising a series inductive reactor 18 and a shunt condenser 19 to output terminals 13.

A shunt current path is connected across the output terminals 13 in parallel with the load 14. The shunt current path comprises a resistor 20 of 15 ohms, for example, and in series therewith a plurality of branch paths one of which comprises the space current path of a space current triode 22 and a resistor 23 in series and the other of which comprises the space current path of a space current triode 24 and a resistor 25 in series. The triodes 22 and 24 are shown in the drawing as triodes of twin triode tube 26. The resistors 23 and 25 each have resistance of 27 ohms, for example, and these resistors connect the cathodes, respectively, of the triodes 22 and 24 to the negative output terminal 13. Only two triodes 22 and 24 together with their cathode resistors are shown for the purpose of illustration. The number of triodes required will depend upon the maximum current required to be shunted through the shunt current path and the maximum safe current which can be transmitted through the space current path of each triode. A voltage dividing potentiometer 21 is connected across the resistor 20.

The resistance of the space current paths of triodes 22 and 24 is controlled in response to instantaneous voltage changes across the load 14 through an amplifier comprising triodes 27 and 28 of a twin triode tube 29. A resistor 30, a potentiometer 31 and a resistor 32 are connected in series across the load. A cold cathode, gas-filled, constant voltage device 33 and a resistor 34 in series are connected across the load. A voltage divider comprising resistors 35 and 36 in series is connected across the constant voltage tube 33, a condenser 37 being connected across the resistor 36. The cathode of triode 28 is connected to the common terminal of resistors 35 and 36 and the anode of triode 28 is connected to the positive load terminal through a resistor 68. The cathode of triode 27 is connected to the common terminal of resistor 34 and constant voltage device 33. There is provided a transformer 37 having a primary winding connected to the alternating-current supply source 12. An auxiliary rectifying element 38 and a condenser 39 in series are connected across the secondary winding of transformer 37 to set up a direct voltage across the condenser 39. The positively charged terminal of condenser 39 is connected to the anode of triode 27 and the negatively charged terminal of condenser 39 is connected through a resistor 40 to the cathode of triode 27. The control electrode of triode 28 is connected to the variable tap of potentiometer 31 and the control electrode of triode 27 is connected to the anode of triode 28. The negative terminal of condenser 39 is connected through a resistor 41 to the control electrode of triode 24 and through a resistor 42 to the control electrode of triode 22.

Considering the operation of the regulating apparatus as thus far described, if the load voltage increases, for example, due to an increase of the voltage of source 12 or due to a decrease of load, the potential of the control electrode of triode 28 with respect to its cathode potential will become relatively more positive with the result that the control electrode of triode 27 will become relatively more negative with respect to its cathode. The space current of triode 27 will therefore decrease to cause the voltage across resistor 40 to decrease. The control electrodes of triodes 22 and 24 will become relatively more positive with respect to the cathodes of these triodes to cause the current flowing through the shunt current path comprising resistor 20 and the space current paths of triodes 22 and 24 to increase. The current flowing through the secondary winding of transformer 17, the rectifier elements 16 and the inductive reactor 18 thus increases to cause an increase of the voltage drop across the resistive component of this circuit and thereby cause a decrease of the rectifier output voltage across terminals 13 and the voltage across the load. Instantaneous changes of load voltage are thus minimized.

Within the operating current range of the space current devices like the triodes 22 and 24, slower changes of load voltage are also minimized in this manner.

To avoid overloading the triodes in the shunt current path, changes of the average current in the shunt current path are minimized by providing means for changing the alternating voltage across the rectifier input terminals 11 in response to average current changes in the shunt current path. For this purpose there is provided control apparatus comprising a twin triode tube 50 having triodes 51 and 52, an auxiliary rectifier 53, an autotransformer 54 and a saturable reactor 55.

Alternating current from the supply source 12 is supplied through a series portion 56 of autotransformer 54 to the primary winding of transformer 17 which is connected to the rectifier input terminals 11. Current from the supply source is also supplied through a shunt portion 57 of the autotransformer winding in series with the parallel connected impedance windings 58 and 59 of saturable reactor 55. A filter for suppressing the third harmonic of the fundamental frequency of the supply source 12 which is generated by autotransformer 54 and saturable reactor 55 is connected across the rectifier input terminals 11 and comprises an inductive reactor 60 and a condenser 61 in series.

Alternating current from the supply source 12 is supplied through a transformer 62 to the input terminals of auxiliary rectifier 53. A ripple filter comprising a series of inductive reactor 63 and a shunt condenser 64 is connected across the output terminals of auxiliary rectifier 53. Current is supplied to a circuit going from the positive output terminal of auxiliary rectifier 53 through reactor 63 to the anodes of triodes 51 and 52 and from the cathodes of triodes 51 and 52 through resistors 65 and 66, respectively, through a saturating winding 67 of saturable reactor 55 to the negative terminal of rectifier 53. The amplitude of the direct current supplied to the saturating winding 67 is controlled by the resistance of the space current paths of triodes 51 and 52 which, in turn, is controlled by the voltage impressed upon the control electrode-cathode circuits of the triodes. The voltage across an adjustable portion of potentiometer 21 is impressed upon an integrating circuit comprising a resistor 70 and a condenser 71. One terminal of condenser 71 is connected through a resistor 72 to the control electrode of triode 51 and through a resistor 73 to the control electrode of triode 52. The other terminal of condenser 71 which is conductively connected to the positive load terminal is connected through resistors 65 and 66 to the cathodes, respectively, of triodes 51 and 52.

It is seen that the voltage across condenser 71 which is impressed upon the control circuits of triodes 51 and 52 is proportional to the average current flowing through the shunt current path comprising the space current paths of triodes 22 and 24. If the average current in the shunt current path increases, for example, the control electrodes of triodes 51 and 52 will become relatively more negative with respect to the cathodes of these triodes. As a result, the current supplied from auxiliary rectifier 53 to the saturating winding 67 decreases, thereby increasing the impedance of reactor windings 58 and 59 and reducing the current supplied to the portion 57 of the autotransformer winding. The alternating voltage supplied to the input terminals 11 thus decreases to cause a reduction of the voltage across the output terminals 13 of rectifier 10. This voltage reduction across the load will make the control electrodes of triodes 22 and 24 relatively more negative with respect to the cathodes to cause a reduction of the space current in the triodes 22 and 24 of the shunt current path across the load.

The regulator comprising tube 50, autotransformer 54 and saturable reactor 55 reduces the average or direct component of the current flowing in the space current paths of the tubes, such as tube 26, in the shunt current path across the load whenever the load is reduced or the input line voltage increases. Overloading of the tubes in the shunt current path is thus prevented. In a particular embodiment of the invention, it was found that six tubes, like tube 26, were required, the anodes of the tubes being conductively connected and the cathodes being connected through resistors like resistors 23 and 25 to the negative load terminal. If the regulating apparatus comprising tube 50, the saturable reactor 55 and the autotransformer 54 were not employed, it would be necessary to increase the number of tubes in the shunt current path from six to thirty tubes in order to provide regulation to no load. Therefore, providing the apparatus for regulating the alternating voltage supplied to the rectifier resulted in a saving of 24 tubes like the tube 26.

What is claimed is:

1. In combination, rectifying means having an input and an output, said rectifying means having resistance, a load connected across said output, means for impressing an alternating voltage from an alternating-current supply source upon said input to cause direct current to be supplied to said load, a space current device having a space current path and control means for controlling the resistance of said space current path in response to a control voltage impressed upon said control means, a shunt current path including said space current path connected across said output in parallel with said load, means for impressing upon said control means a control voltage which varies in response to load voltage changes for substantially instantaneously controlling the current in said shunt current path to minimize said changes of load voltage, and means responsive to average current changes in said shunt current path for controlling the alternating voltage impressed upon said input to minimize changes of average current in said shunt current path.

2. In combination, rectifying means having an input and an output, said rectifying means having resistance, a load connected across said output, means for impressing an alternating voltage upon said input to cause direct current to be supplied to said load, a space current device having a space current path and control means for controlling the resistance of said space current path in response to a control voltage impressed upon said control means, a shunt current path including said space current path connected across said output in parallel with said load, means for impressing upon said control means a control voltage which varies in response to load voltage changes for substantially instantaneously controlling the current in said shunt current path to minimize said changes of load voltage, means comprising a saturable reactor having a saturating winding for controlling the input voltage to said rectifier in response to amplitude changes of the current supplied to said saturating winding, and means responsive to the average current in said shunt current path for controlling the current supplied to said saturating winding to thereby minimize changes of said average current in said shunt current path.

3. In combination, a rectifier for supplying direct current to a load, an autotransformer having a first and a second winding portion, means for supplying alternating current from an alternating-current supply source to said rectifier through a circuit comprising said first winding portion, a saturable reactor having an impedance winding and a saturating winding to which direct current is supplied for controlling the impedance of said impedance winding, means for supplying current from said supply source through said impedance winding to said second winding portion of said autotransformer, a space current device, means for supplying space current from said rectifier to said space current device, means for minimizing load voltage changes comprising said space current device and means responsive to instantaneous load voltage changes for controlling the space current in said space current device, and means responsive to the average space current in said space current device for controlling the supply of direct current to said saturating winding to minimize changes of the average space current in said space current device.

4. In combination, rectifying means having an input to which alternating current is supplied and an output from which direct current is supplied to a load, a first space current device having a space current path and control means for controlling the resistance of said space current path, resistance means, a shunt current path connected across said load comprising in series said resistance means and the space current path of said first space current device, an autotransformer having a first and a second winding portion, means for supplying alternating current from an alternating-current supply source through said first winding portion to said rectifier input, a saturable reactor having an impedance winding and a saturating winding, means for supplying current from said supply source through said impedance winding to said second winding portion of said autotransformer, a second space current device having a space current path and control means for controlling the resistance of said space current path, means for supplying direct current through the space current path of said second space current device to said saturating winding and means for impressing a portion at least of the voltage across said resistance means upon the control means of said second space current device to control the resistance of its space current path.

5. In combination, a bridge rectifier having a pair of input and a pair of output terminals, a transformer having a primary and a secondary, means for connecting said secondary to said input terminals, an autotransformer having a first and a second winding portion, a saturable reactor comprising an impedance winding and a saturating winding, means for supplying current from an alternating-current supply source to a circuit comprising said first winding portion of said autotransformer and said primary in series, means for supplying current from said supply source to a second circuit comprising said second winding portion of said autotransformer and said impedance winding of said saturable reactor in series, a ripple filter comprising an inductive reactor and a first condenser for suppressing alternating components of the output current of said rectifier, means for supplying current from said rectifier output terminals through said inductive reactor to said load, a shunt current path connected across said load, said shunt current path comprising a first resistor and the space current path of a first space current device in series, said space current device having control means for controlling the resistance of said space current path, means for deriving from the voltage across said load and impressing upon said control means of said first space current device a voltage which varies in response to load voltage changes but the percentage variation of which is larger than the corresponding percentage variation of the load voltage, an increase of load voltage causing the space current in said space current device to increase and vice versa, a second space current device having a space current path and control means for controlling the resistance of said space current path, a second condenser, a second resistor, means for impressing a portion at least of the voltage across said first resistor upon a circuit comprising said second condenser and said second resistor in series to charge said second condenser, an auxiliary rectifying means for supplying current through the space current path of said second space current device to the saturating winding of said saturable reactor, and means responsive to an increase of average voltage across said first resistor for decreasing the current in said saturating winding and vice versa, said last-mentioned means comprising means for impressing the voltage to which said second condenser is charged upon the control means for said second space current device.

6. In combination, a rectifier, a saturable reactor having an impedance winding and a saturating winding, means comprising said reactor and said rectifier for supplying rectified current from an alternating-current supply source to a load, a space current device having a space current path and control means for controlling the resistance of said space current path in response to a control voltage impressed upon said control means, a shunt current path including said space current path connected across said load, means for impressing upon said control means a control voltage which varies in response to load voltage changes for substantially instantaneously controlling the current in said shunt current path to minimize said load voltage changes, means for supplying current to said saturating winding, and means responsive to average current in said shunt current path for controlling the current in said saturating winding to minimize changes of average current in said shunt current path.

References Cited in the file of this patent
UNITED STATES PATENTS

| 2,018,348 | Dijksterhuis | Oct. 33, 1935 |
| 2,207,259 | Koch | July 9, 1940 |
| 2,331,131 | Moyer | Oct. 5, 1943 |
| 2,377,370 | Potter et al. | June 5, 1945 |
| 2,428,693 | Anderson | Oct. 7, 1947 |
| 2,434,069 | Goldberg | Jan. 6, 1948 |
| 2,630,557 | Bixby | Mar. 3, 1953 |